United States Patent
Kessels et al.

(10) Patent No.: US 7,185,220 B2
(45) Date of Patent: Feb. 27, 2007

(54) INFORMATION EXCHANGE BETWEEN LOCALLY SYNCHRONOUS CIRCUITS

(75) Inventors: Jozef Laurentius Wilhelmus Kessels, Eindhoven (NL); Adrianus Marinus Gerardus Peeters, Eindhoven (NL); Paul Wielage, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 430 days.

(21) Appl. No.: 10/500,520

(22) PCT Filed: Dec. 6, 2002

(86) PCT No.: PCT/IB02/05204

§ 371 (c)(1),
(2), (4) Date: Jun. 29, 2004

(87) PCT Pub. No.: WO03/060727

PCT Pub. Date: Jul. 24, 2003

(65) Prior Publication Data

US 2005/0141257 A1 Jun. 30, 2005

(30) Foreign Application Priority Data

Jan. 2, 2002 (EP) .................................. 02075578

(51) Int. Cl.
*G06F 1/04* (2006.01)
*G06F 5/06* (2006.01)

(52) U.S. Cl. ...................... 713/600; 713/500

(58) Field of Classification Search ................ 713/500, 713/600
See application file for complete search history.

(56) References Cited

U.S. PATENT DOCUMENTS 6,425,088 B1 * 7/2002 Yasukawa et al. .......... 713/400
7,065,665 B2 * 6/2006 Jacobson et al. ........... 713/400

OTHER PUBLICATIONS

Muttersbach et al., Practical Design of GLobally-Asynchronous Locally-Synchronous Systems, Apr. 2000, pp. 52-59.*
Zhuang et al., An Asynchronous Wrapper with Novel Handshake Circuits for GALS Systems, Jul. 1, 2002, IEEE, 1521-1525.*
Villiger et al., Self-timed Ring for Globally-Asynchronous Locally-Synchronous Systems, May 15, 2003, IEEE, pp. 1-10.*

* cited by examiner

*Primary Examiner*—Chun Cao
*Assistant Examiner*—Mark Connolly (57) ABSTRACT

A locally synchronous circuit module has a delay circuit having and input and output coupled to a clock input. The delay circuit provides a delay which when incorporated in a clock oscillator ensures a clock period that is at least as long as needed to transfer information between the storage elements. A handshake circuit is provided for generating handshake signals for timing information transfer between the locally synchronous circuit module and a further circuit. The handshake circuit comprises the delay circuit, so that at least part of the handshake signals during a handshake transaction are timed by traveling through the delay circuit and are applied to the clock input to clock the locally synchronous circuit module.

10 Claims, 4 Drawing Sheets

INFORMATION EXCHANGE BETWEEN LOCALLY SYNCHRONOUS CIRCUITS

The invention relates to a digital electronic circuit with one or more locally synchronous circuit modules.

From a publication by J. Muttersbach, T. Villiger and W. Fichtner, titled "Practical Design of Globally Asynchronous Locally Synchronouus Systems and published in the Proceedings of the international symposium on advanced research in asynchronous circuits and systems, April 2000, pages 52–59 it is known to provide communication between a number of locally synchronous circuit modules.

Most present day circuits are synchronous circuits in which internal data transport between all different registers (possibly via sequential logic circuits) is timed by a single central clock signal or a plurality of synchronized clock signals. For various reasons it is desirable to switch to architectures with a plurality of such synchronous circuit modules, each operating under control of its own clock signal, the clock signals of the different circuits being asynchronous from one another. Thus, each circuit modules is locally synchronous, but the different modules operate asynchronously from one another.

In such circuits with locally synchronous modules a problem arises when information needs to be exchanged between different modules. Because the clock signals of the different modules are not synchronized, the different modules cannot be connected without further measures. It is necessary to provide interface circuits to guarantee that a module that outputs information does not change that information when another module needs the information to be constant in order to read the information.

The article by Muttersbach et al. discloses a circuit that implements the interface circuits by means of a pausable clock. When information needs to be exchanged between a first and second module the clocks of these modules are temporarily stopped. While the clocks are stopped a conventional asynchronous handshake is used to transfer the information. The asynchronous handshake uses two signals: a request signal from the first module to the second module to indicate when the information is a available and an acknowledge signal from the second module back to the first module to indicate when the information has been received.

The pausable clock circuits of Muttersbach et al. each comprise an arbiter (a mutual exclusion element) and an inverting delay line whose output is coupled to its input via the arbiter. A feedback from the output of the delay line to its input causes the generation of clock pulses. The input signal of the delay line is fed to the locally synchronous circuit as a clock signal. The pausable clock circuit ensures that the active part of the clock signal (the clock pulse, during which the clock is high) always has the same length. The passive part (clock low) can be extended when the clock is paused. Clock glitches (shorter times between clock transitions) are prevented. The arbiter ensures that handshake signals are only exchanged when the clock signal is passive (low). However, the arbiter has the disadvantage that it can cause unpredictable delays in case of metastability. Metastability occurs when transitions at the inputs of the arbiter occur nearly simultaneously. In this case it can take a long time before one of the signals is passed.

The circuit of Muttersbach et al. requires a register between the modules that exchange information, for temporarily storing the information. This is because the handshake is executed while the clock is passive, so that the modules themselves cannot change or receive data during the handshake. The register causes circuit overhead in the circuit and it delays the response time of the circuit.

Amongst others, it is an object of the invention to provide for a circuit with locally synchronous circuit module in which the clock input to the locally synchronous circuit module does not need to be made passive during exchange of data between the locally synchronous circuit module and further circuits.

Amongst others, it is another object of the invention to provide for a circuit with locally synchronous modules in which no register is needed during information exchange between the modules.

Amongst others, it is another object of the invention to provide for a circuit with locally synchronous modules in which the use of circuits that suffer from metastability problems is minimized.

The circuit according to the invention is set forth in claim 1. According to the invention the delay line in the oscillator circuits remains an active part of the circuit during information exchange between the locally synchronous modules. During the exchange the coupling from the output of the delay line to its input is rerouted so that the delay line participates in generating handshake signals which also act as clock signals for the locally synchronous modules.

In an embodiment of the circuit according to the invention the coupling between the output of the delay line and its input is routed through a local path so that the clock signals are generated autonomously as long as the locally synchronous circuit module does not need to exchange information with the further circuit. When information has to be exchanged the coupling is rerouted to create a handshake circuit. Thus, the locally synchronous circuit module can operate at maximum speed when no exchange of information is needed.

In a further embodiment the information is exchanged using temporally overlaid information exchange transactions, for example by sending successive commands and returning responses to each command while a subsequent command is sent. When a last command has been sent a different operation occurs in that a response needs to be received while not sending a subsequent command. In this embodiment the coupling between the output of the delay line and its input is rerouted through the local path when the last command has been sent, but the local path is disabled until the last response has been received. Thus, the exchange of information is properly timed and it is avoided that the timing of new commands is triggered. This can be applied advantageously to reading of data from a memory, where the data for one address is returned when a next address is applied. According to the embodiment no next memory cycle needs to be started by the handshake interface to receive the data.

In a further embodiment it is possible to overrule the disabling dependent on the command. Thus, if no response is needed the clock can operate at maximum speed immediately, without waiting for the response. In the case of memory access, for example, in this way the clock can operate at high speed immediately after a write operation, and can be delayed after a read operation, when data needs to be returned from memory.

In another embodiment, a plurality of further circuits is provided, which may operate asynchronously from one another. For this case a demultiplexer is provided which allows selection from a plurality of couplings to couple the output of the delay line to its input. Different ones of the couplings provide for generating handshakes with different ones of the further circuits.

In another embodiment a plurality of locally synchronous circuit modules is provided, which share access to the further circuit. In this case handshakes from the further circuit may be exchanged with any of the locally synchronous circuit modules. An arbiter is used to arbitrate to which of the locally synchronous circuit modules the handshake goes. Thus multiple locally synchronous circuit modules can share access to the further circuit. In an embodiment, the locally synchronous module can reroute the coupling between the output and input of its delay line either locally or in synchonism with the arbiter. Thus the locally synchronous module can operate at maximum speed when it does not need to access memory and its clock signal is delayed by a minimum amount when it accesses memory. In a further embodiment the further circuit is a memory and an exchange module is included to make the arbiter in front of the memory appear as if it was an unshared memory. Thus the locally synchronous circuit modules, the locally synchronous circuit module are minimally delayed by the fact that they share the same memory. In an embodiment write operations need not wait for the return of data from the shared memory.

Of course the locally synchronous circuit module may be incorporated in an integrated circuit with its delay line and handshake interface. The further circuits with which the locally synchronous circuit module communicates may be included in the same integrated circuit, or they may be provided in separate integrated circuits that can be connected to the integrated circuit with the locally synchronous circuit module.

These and other advantageous aspects of the circuit according to the invention will be described in more detail using the following Figures.

Figure 1:
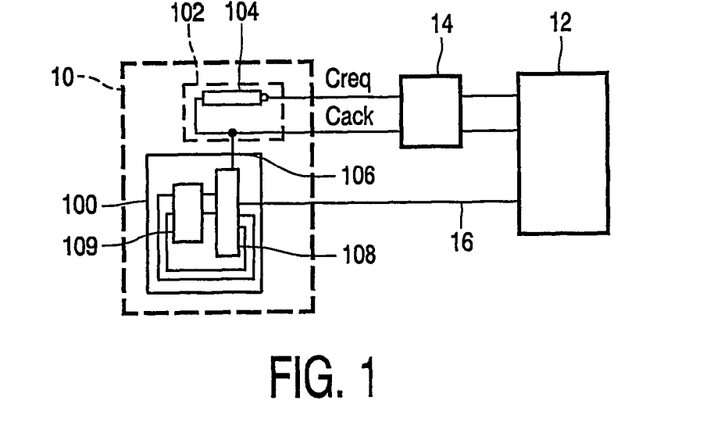
FIG. 1 shows a circuit-with a locally synchronous module.

FIG. 1 shows a circuit with a first circuit 10, a second circuit 12, a handshake interface circuit 14 and an interface 16 for information exchange. The first circuit 10 comprises a locally synchronous circuit module 100 and a clock circuit 102. Locally synchronous circuit module 100 comprises a plurality of registers 108 and logic and/or arithmetic circuitry 109. Outputs of the registers 108 are coupled to inputs of the registers 108 via logic and/or arithmetic circuitry 109. This connection may form a pipe-line containing successively different ones of the registers 108 at successive stages of the pipe-line and/or loops in which an output of one or more of the registers 108 is fed back, directly or indirectly to its inputs.

The clock circuit 102 is coupled to a clock input 106 for clocking registers 108. The clock circuit 102 comprises an inverting delay line 104 (implemented for example as a cascade of an odd number of inverters). An input of the delay line 104 is coupled to the clock input 106.

Registers 108 from locally synchronous circuit module 100 are coupled to the second circuit 12 via interface 16 for information exchange (if necessary sequential logic circuits may be included in the coupling). The input and output of the inverting delay line 104 of first circuit 10 are coupled to the second circuit 12 via handshake interface.

In operation locally synchronous circuit module 100 is designed as a conventional synchronous circuit. That is, during operation the plurality of registers 108 is clocked via a common clock input 106, so as to load data output from the registers 108 directly, or after intermediate processing by logic and/or arithmetic circuitry 109. In principle, there will be many different paths through which data flows from registers 108 in parallel back to the registers 108. Each path may need a different time interval to propagate the data from the registers 108 back to the registers 108. The clock period with which the registers 108 can be clocked should exceed a minimum allowable duration, which corresponds to the maximum time interval needed for any data to propagate from the registers 108 back to the registers and the time needed by registers 108 to set up and load data. The delay line 104 produces a delay which corresponds to this minimum allowable duration. Therefore, if the input of the delay line 104 would be coupled to its output, the delay line would generate a clock oscillation with the required clock period.

The delay line 104 is coupled to the handshake interface 14 so as to synchronize the clock oscillation of the clock circuit 102 with handshakes from second circuit 12. This allows data to be exchanged with second circuit 12. A rising signal edge at the output of inverting delay line 104 is treated as a request Creq for data transfer and passed to second circuit 12. During data transfer from first circuit 10 to second circuit 12 for example, the data to be transferred will be output by registers 108 and stable on the information exchange interface 16 between first circuit 10 and second circuit 12. When second circuit 12 indicates that the request is accepted (for example when the data has been loaded into second circuit) an acknowledge signal Cack is passed back from second circuit 12 to the input of the delay line 104, causing the delay line 104 to change back the Creq signal after a delay. The fall in the Creq signal indicates to second circuit 12 that first circuit 10 has removed the data from the interface. When second circuit 12 in turn indicates that new data may be placed on the interface 16 the acknowledge signal Cack is pulled low, causing the delay line 104 to change back the Creq signal after a delay and so on. Thus, the delay line 104 is operated as a clock for locally synchronous circuits 100 and at the same time as a handshake interface towards second circuit 12.

It will be understood that, although this mechanism has been described in terms of data transfer from first circuit 10 to second circuit 12, the mechanism applies as well to data transfer from second circuit 12 to first circuit 10.

Figure 2:
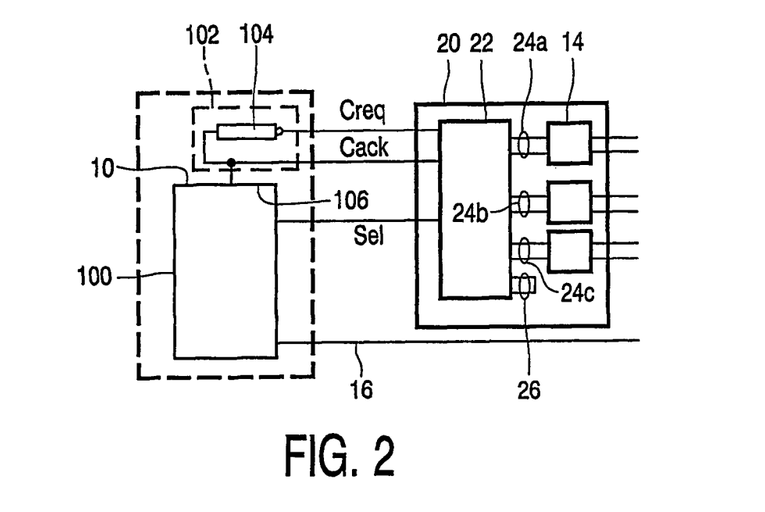
FIG. 2 shows a locally synchronous module with a rerouting circuit.

FIG. 2 shows the first circuit 10, with locally synchronous circuit 100 and clock circuit 102 coupled to a multiport handshake interface 20. The locally synchronous circuit module 100 has a select output Sel coupled to the multiport handshake interface 20. The multiport handshake interface 20 contains a handshake demultiplexer 22, with a control input coupled to the Sel output of locally synchronous circuit module 100, and with a first port and a plurality of second ports 24a–c, 26. The first port is coupled to the input and output of delay line 104. A number of the second ports 24a–c is coupled to respective handshake interfaces 14 which in turn may be coupled to various further circuits (not shown) capable of handshake interfacing, such as the second circuits. One of the second ports 26 has a request output and an acknowledge input coupled to each other.

In operation demultiplexer 22 functions to provide a coupling from the output of delay line 104 to the input of the delay line 104 via a selected one of the second ports 24*a–c*, 26. That is, demultiplexer 22 routes a signal between its first port to a selected one of the second ports 24*a–c*, 26. The second port 24*a–c*, 26 is selected under control of the control input se1. When locally synchronized circuit module 100 does not need to exchange information with other circuits that are not locally synchronous with it, the connection between the input and output of delay line 104 is routed through the port 26 that connects the request output and acknowledge input of that port directly. Thus, oscillator circuit 102 is made to oscillate basically as a ring oscillator at a maximum possible clock frequency at which locally synchronous circuit module 100 can operate.

When locally synchronous circuit module 100 has to communicate via interface 16 it directs demultiplexer 22 to reroute the coupling between the input and the output of the delay line 104 via another one of the ports, selected according to the circuit (not shown) with which the information has to be communicated. In that case the output signals of the delay line 104 will lead to input signals of the delay line via a handshake interface 14 to the relevant port. Thus the period of the clock signal applied to the locally synchronous circuit 100 will generally be lowered, so as to adapt to the speed of information exchange.

Figure 3:
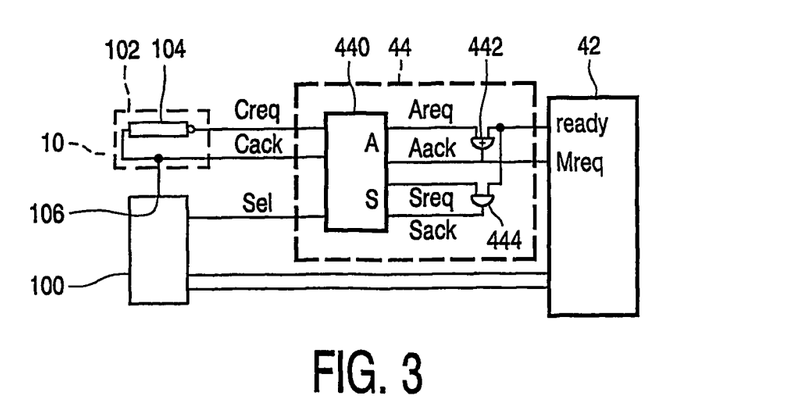
FIG. 3 a handshake demultiplexer.

FIG. 3 shows an implementation of a demultiplexer with two second ports in more detail. The demultiplexer contains a first and second latch 30, 32, a first and second AND gate 34, 36 and an OR gate 38. The Creq output of the delay line 104 of processor 10 is coupled to clock inputs of the latches 30, 32 and to first inputs of the AND gates 34, 36. The se1 output of the synchronous module 100 of the processor 10 is coupled to the data inputs of the latches 30, 32, via an inverting and a non-inverting input respectively. The data outputs of the latches 30, 32 are coupled to the outputs (Req1, Req2) of the second ports of the demultiplexer 140. The latches 30, 32 are of a transparent-low type which passes the se1 signal (or its inverse) when the Creq is low and holds the last value of se1 (or its inverse) when Creq is high. The inputs Ack1, Ack2 of the second ports are coupled to the inputs of OR gate 38. The output of OR gate 38 is coupled to the input Cack of the delay line and the input Creq of the processor 10 and the clock input of the synchronous module 100. It will be understood that if a greater number of ports is required a correspondingly greater number of latches 30, 32 may be provided, each latching a respective se1 signal for a respective port. The respective se1 signals may be obtained by using a multi-line se1 output from first circuit 10, for example with lines for each port.

In operation locally synchronous circuit module causes a change in the logic level of control signal se1 at a time when Creq is high. As a result the new value of se1 is passed to AND gates 34, 36 once Creq becomes low. Subsequently one of the AND gates 34, 36 passes the CReq signal to a corresponding output CReq1, Creq2, the other AND gate blocking the Creq signal, keeping its output Creq1, Creq2 low. Low to high transitions on any of the acknowledge inputs Ack1, Ack2 are passed to the acknowledge output Cack of the first port.

Figure 4:
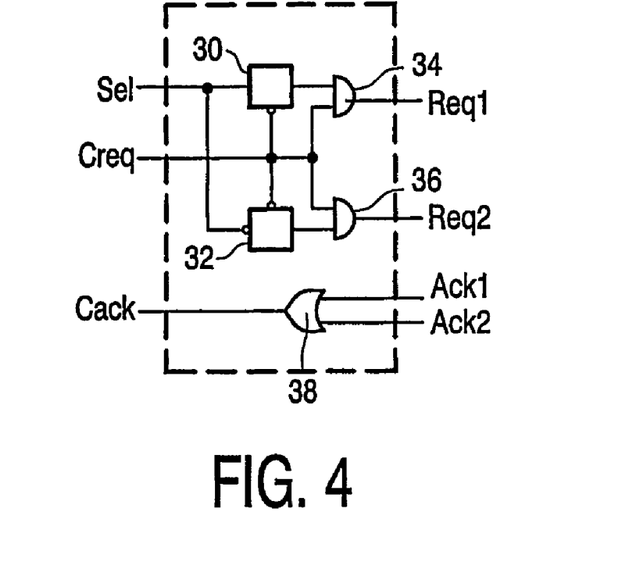
FIG. 4 shows a locally synchronous module and a memory.

FIG. 4 shows a circuit in which locally synchronous circuit module 100 is part of a processor 10 communicating with a memory 12. Although a single memory 42 is shown memory 42 may in fact comprise a number of memory devices that operate in synchronism with one another and/or memory 42 may contain a cache structure. The circuit of FIG. 4 is an specific application of the circuit as shown in FIG. 2. In addition special measures have been taken in the handshake interface to allow the use of conventional memory and processor design. Such designs provide for pipelined read operations, in which an address is applied to the memory in one clock cycle and the resulting data is returned later, while at the same time a subsequent address is applied to the memory.

The circuit of FIG. 4 contains memory 42 and a handshake interface 44. The memory 42 has an access/data data interface coupled to processor 10 (the access part of the interface provides for transfer of addresses and optional further signals such as read/write control signals). The memory 42 has a memory ready output "Ready" fed back to a memory request input Mreq via handshake interface 44. Handshake interface 44 contains a handshake demultiplexer 440, a Muller C element 442 and an AND gate 444. The known Muller C element is designed to output a logic one or a logic zero when both its input signal are logic one or logic low respectively and to retain its prior output signal value when the input signals differ.

The demultiplexer 440 has a first port coupled to the input Cack and output Creq of the delay circuit 104 of the oscillator of the processor 10. The demultiplexer has a second port A (access port) and third port S (skip port) each with input (Aack, Sack) and an output (Sreq, Sack). The demultiplexer 440 has a control input se1 fed by the synchronous circuit 100 of the processor 10.

In operation processor 10 has two modes of operation, a first mode in which memory 12 is not accessed and a second mode in which memory 12 is accessed. In the first mode synchronous module 100 outputs the control signal se1 so as to command demultiplexer 440 to coupled the first port (Creq, Cack) and the third port A (Sreq, Sack). Thus, the output Creq and the input Cack of the delay line 104 are coupled via AND gate 444. Normally the ready signal from memory 12 is high so that the AND gate 144 simply passes the signal from Creq to Cack. As a result, an oscillation occurs in which Creq and Cack are alternately logic high and logic low, and produce a clock signal for synchronous module 100. The delay of delay line 104 is designed so that the aggregate delay caused by the cascade of delay line 104, demultiplexer 440 and AND gate 444 leads to clock periods that are at least as long as any delay period needed to pass data between registers in locally synchronous circuit module 100.

When locally synchronous circuit module 100 has to access memory 12 it causes interface circuit 44 to reroute the coupling from the output Creq of delay line 104 to the input Cack of delay line 104. Instead of passing through AND gate 444, this coupling is now made to pass through Muller C-element 442. As a result a common oscillator circuit comes into existence, which generates one or more clock pulses for both processor 10 and memory 12, to time the transfer of information such as addresses and data between the processor 10 and the memory 12. In case of a memory read operation synchronous module 100 keeps this coupling through the Muller C element 142 during the exchange of address and subsequent data. During a write operation the coupling needs to be maintained only during a simultaneous exchange of address and data information.

Figure 5:
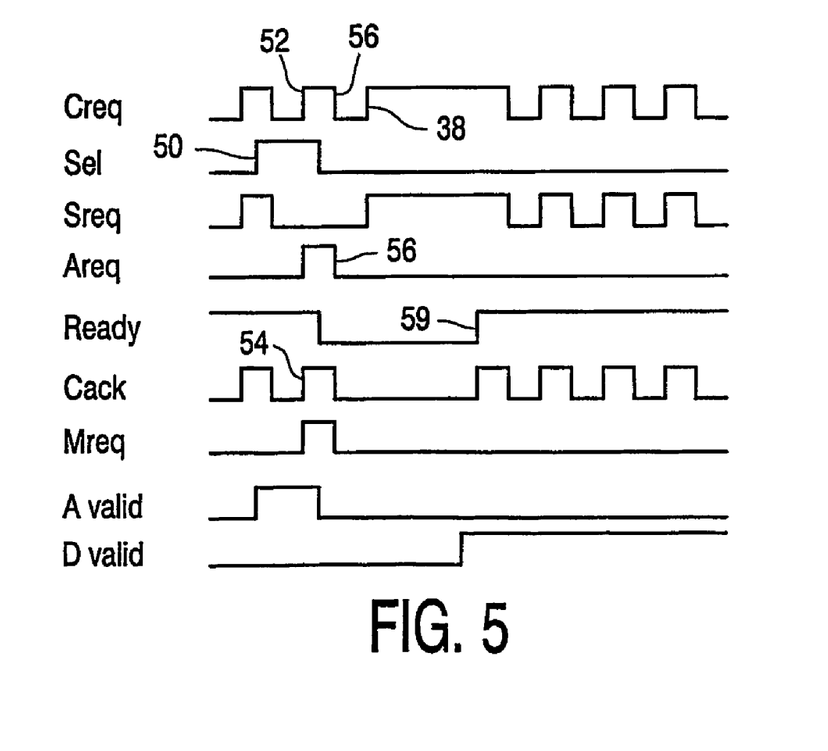
FIG. 5 shows signals occurring during the exchange of information.

FIG. 5 shows signals occurring during memory access in more detail. First of all, during a memory read operation, initially in the first mode, the output Areq of the second port A of the demultiplexer 440 is logic low. At the start of memory access synchronous module 100 applies an address (and optionally data) to memory 42 via the access/data interface and causes a change 50 in the logic level of control signal se1 at a time when Creq is high. As a result the new value of se1 is passed to AND gates 34, 36 once Creq becomes low. Subsequently Sreq remains low as long as se1 keeps this value.

The next low to high transition 52 of Creq is passed to the output Areq of the demultiplexer 140. Since "ready" is high this leads to a low to high transition 54 on Mreq, Aack (shown collectively as Mreq) and Cack. This transition 54 starts a next clock cycle in synchronous module 100 and signals to memory 42 that access information, including an address and, optionally, data, is available and that a memory operation using this information is required. In this clock cycle synchronous module 100 changes back se1 again to reroute the feed-back part of the clock oscillator on the next edges of Creq demultiplexer 440 so that subsequent transitions of Creq are passed via AND gate 444.

Memory 42 responds to the rising edge on Mreq by making "ready" low to indicate that the information from processor 10 has been received. After a delay determined by inverting delay circuit 104 the rising edge 54 on Cack leads to a falling edge 56 on Creq and Areq. The changed value of se1 is now passed to AND gates 34, 36. When ready and Aack are low the Muller C element 442 makes MReq, Aack and Cack go low, terminating the active part of the clock cycle. It will be appreciated that the time at which Mreq goes low depends on whichever of Areq (Creq) and ready goes low latest, i.e. that the time interval over which MReq, Aack and Cack are high may be longer that the delay caused by delay circuit 104.

In response to the low value of Cack delay circuit 104 will cause a low to high transition 58 in Creq and Sreq after a delay determined by delay circuit 104. Memory 42 will cause a low to high transition 59 in "ready" when data has become available upon reading. Usually the time interval up to this transition 59 is much longer than the delay caused by delay circuit 104. When both Sreq and "ready" are high AND gate 144 makes Sack and Cack go high. This clocks synchronous module 100, causing it to load the data from memory 42. Because ready is now high and se1 is back at its original level the frequency of the clock signal generated for the synchronous module 100 no longer depends on delays determined by memory 42. Thus synchronous module 100 returns to high speed operation with its own local clock pulses until a next memory read operation is needed.

When synchronous module 100 has to execute a series of successive read operations it may keep se1 unchanged at the level reached at the start of the first operation. Thus in response to each low to high transition of the "ready" signal a next Mreq pulse will be generated (assuming the memory 42 to be slower than the processor 10). During each next Mreq pulse processor 10 supplies a new address to the access/data interface simultaneously with receiving data for a previous address, if that previous address was involved in a read operation.

The data received in response to the last address (or the only address in case of a single read operation) is received when the demultiplexer 440 already routes signals between the output and input of inverting delay line 104 via the third port S. Because AND gate 444 is attached to this port S the low to high transition from the output Creq of the delay line 104 will be passed back to the input Cack of the delay line 104 only when the "ready" signal has gone high. Thus, it is ensured that the first pulse that travels via third port S is passed only when data is available. Because second port A is not used to ensure a delay until data is available no new Mreq pulse is generated so that memory 42 remains in a ready state for receiving a next address. Of course multiple access operation can also be realized by changing the logic level of se1 back and forth for each access operation.

In principle clock pulses for write operations can be generated in the same way as for read operations. In this case, the processor 10 waits until the data has been stored in memory 12, and the processor clock is delayed until storing has been completed. However, in an embodiment processor 10 does not wait for completion of writing but resumes operation at full speed during the time that memory 12 is still busy storing the data.

Figure 6:
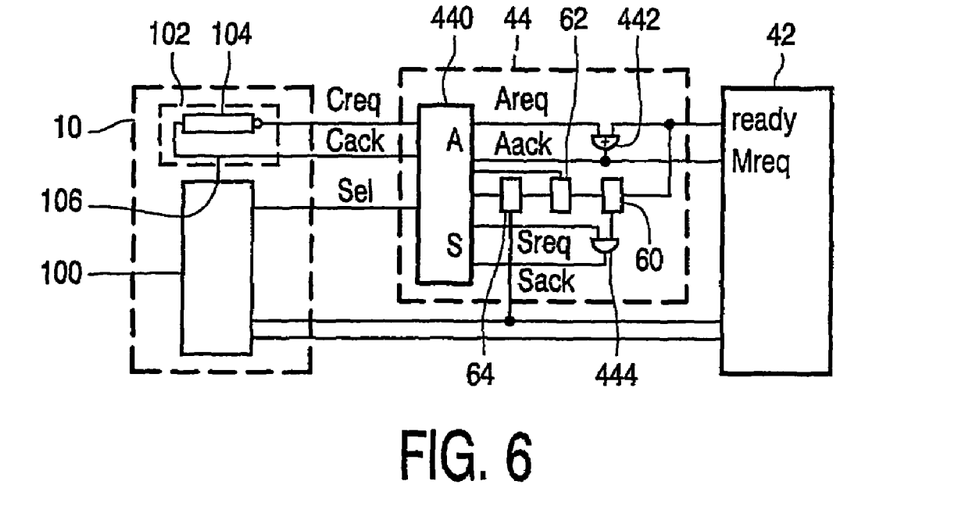
FIG. 6 shows a locally synchronous module with a memory.

FIG. 6 shows a modified circuit that supports this type of operation. In addition to the components shown in FIG. 4, the circuit of FIG. 6 contains an additional AND gate 64, a read flipflop 62 and an OR gate 60. The additional AND gate 64 receives the se1 signal and a read/write control signal from the interface between processor 10 and memory 42. The output of the additional AND gate 64 is coupled to the data input of the read flipflop 62. The read flipflop 62 is clocked by the rising edge of Cack. The data output of the read flipflop 62 is coupled to OR gate 60 together with the ready output from memory 42. The output of the OR gate 60 is coupled to AND gate 444 that passes Sreq to Areq for the third port.

Thus, the direct coupling of the ready signal to AND gate 444 is replaced by an indirect coupling that forces the input of AND gate 444 high unless there has been a read operation. Thus, low to high transitions on Sreq (caused by low to high transitions on Creq) are delayed only in case of the read operation. In case of a write operation the first pulse via third port S after access to memory 42 is as fast as any other pulse passed via third port S. In case of a read operation this first pulse is delayed until memory 42 is ready.

The explanation of FIGS. 4 and 6 assume a "one-deep" memory pipe-line, i.e. they assume that data is for an address is delivered from memory one cycle after applying the address. Of course a deeper pipelined memory may be used, which delivers data a greater number of cycles after access. In this case, pipelined data remains in memory 42. When the processor 10 needs to perform isolated read actions it must keep the second port A selected for a sufficient number of cycles for memory 42 to produce the data. Similarly the explanation has assumed that only during a single cycle data is passed in conjunction with an address. If more than one successive cycle is used the processor may keep the second port A selected for a number of cycles for memory 42 after supplying the address.

A number of memories that operate asynchronously from one another may be used in parallel with memory 42. In this case, the acknowledgement of requests Creq by processor 10 may be controlled by those memories that are accessed and those that have to deliver data. This may be realized for example by using a correspondingly greater number Muller C elements 442 and second ports A on demultiplexer 440, each for a respective one of the memories. In this case, additional AND gate 64, read flip-flop 62 and OR gate 60 are provided for each memory. A further AND gate is provided that inputs the output signals from all of the OR gates 60. The output of the further AND gate is input to the AND gate 444 and to additional inputs of the Muller C-elements so that rising pulses are passed from these C elements and the AND gates only if all OR gates indicate that either the previous operation was not a read access or that the access memory is ready.

Figure 7:
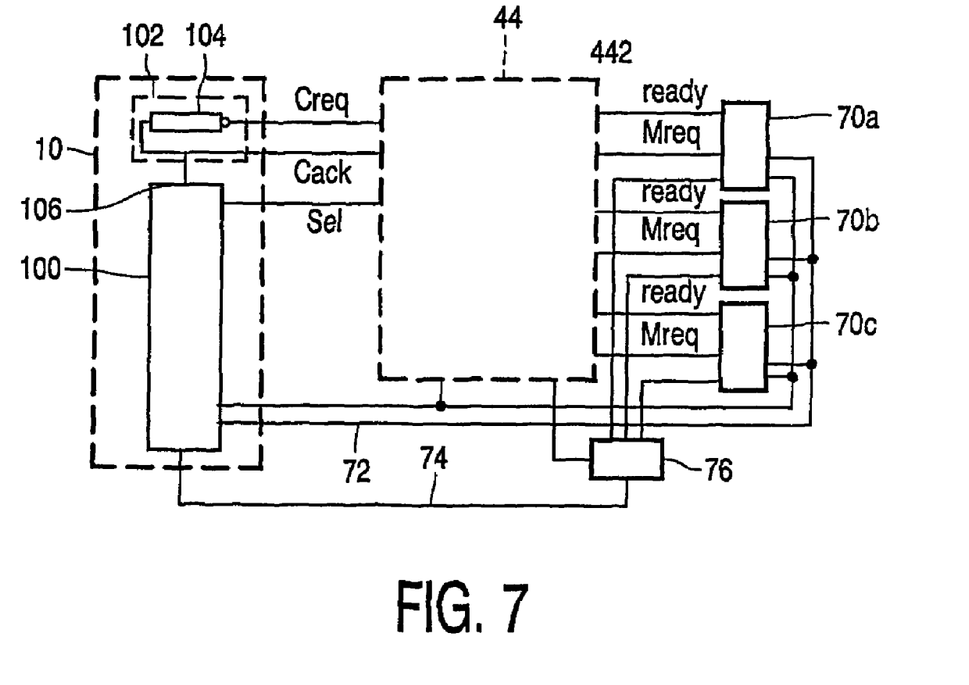
FIG. 7 shows a locally synchronous module with a plurality of memories.

FIG. 7 shows an embodiment with a plurality of memories 70*a–c*. The processor 10 has separate ports 72, 74 for write data and read data. Similarly, the memories 70*a–c* have separate ports for write and read data. A read data multiplexer is provided between read data ports of the memories 70*a–c* and the read port of the processor 10. This multiplexer 76 passes the read data from the accessed memory to the processor 10. The multiplexer 76 may be controlled for example by the outputs of read flip-flops for the different memories, since these flip-flops indicate which of the memories was read in the previous cycle. But of course many other ways of controlling the muliplexer may be used, for example a selection register that stores the se1 signal for the previous cycle may be used to control the multiplexer instead.

It will be appreciated that the circuits described are merely examples of the circuit according to the invention. For example, without deviating from the invention the use of the signal levels of part or all of the circuits may be inverted. In conjunction with this the locally synchronous circuits might be clocked by the output of the delay line. The necessary inversion to cause an oscillation through the delay line might be provided in the handshake circuit. Neither is the invention limited to the particular type of handshake protocol that was used by way of example. Other handshake protocols, using for example a greater or smaller number of handshake lines may be used.

As shown the locally synchronous circuit module 10 communicates with a second circuit 12, which may be a memory. The second circuit may be an asynchronous circuit, or it may be a locally synchronous circuit itself, operating under control of a clock oscillator circuit whose delay path is rerouted through the handshake interface with circuit module 10. Thus, a common clock oscillator circuit is formed during the handshake.

Figure 8:
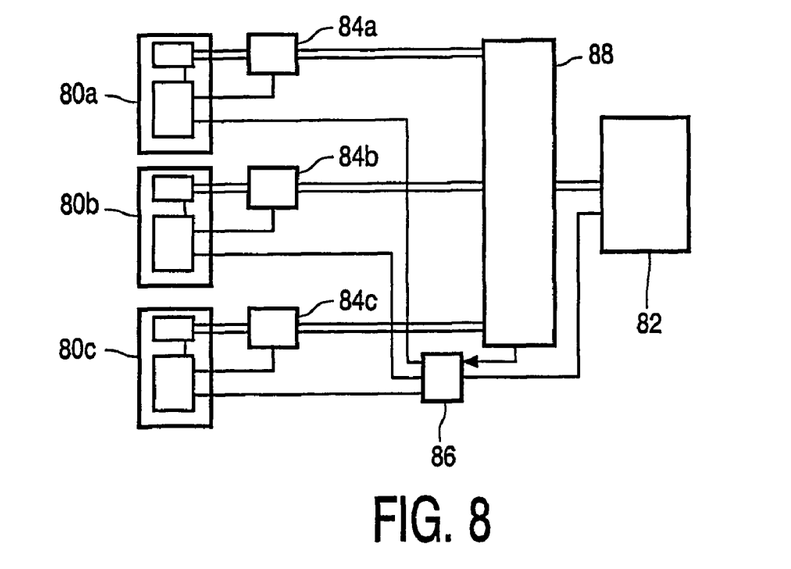
FIG. 8 shows a plurality of circuit modules with a shared second circuit.

FIG. 8 shows a circuit with a plurality of locally synchronous circuit modules 80*a–c*, each with its own clock oscillator circuit 81*a–c*. The locally synchronous circuit modules 80*a–c* all have access to the second circuit 82 via the same port of the second circuit. Each locally synchronous circuit module has its own handshake interface 84*a–c* between the locally synchronous circuit module 80*a–c* and the second circuit 82. An arbiter circuit 88 is included between the handshake interfaces 84*a–c* and the second circuit 82. A multiplexer and/or demultiplexer 86 is included between the information exchange interfaces of the locally synchronous circuit modules 80*a–c* and the second circuit 82. A multiplexer and/or demultiplexer 86 is controlled by the arbiter 88.

In operation locally synchronous modules 80*a–c* are coupled to second circuit 82 one at a time. At such time the coupling between the output and the input of the delay line in its clock circuit is rerouted via a handshake interface 84*a–c* with the second circuit 82 and the handshake signals flow through the delay line.

Each locally synchronous module 80*a–c* can cause the coupling between the output and the input of the delay line in its clock circuit to be rerouted via a handshake interface with the second circuit 82. The arbiter 88 passes the handshake signals between the second circuit 82 and the handshake interface 84*a–c* of the relevant locally synchronous circuit module 80*a–c*. If another one of the locally synchronous circuit modules 80*a–c* attempts to start a further handshake with the second circuit while a earlier handshake is in progress, the arbiter 88 passes the further handshake to the second circuit 82 only when the earlier handshake has been completed. This may be done for example by acknowledging the request of the further handshake only when the earlier handshake has been completed. When two or more locally synchronous circuit modules 80*a–c* attempt to access the second circuit at the same time the arbiter selects one of these circuit modules 80*a–c* and passes the handshake of this circuit module first. Arbiter 88 causes multiplexer and/or demultiplexer 86 to connect the information exchange interface of second circuit 82 to the information exchange interface of the circuit module 80*a–c* whose handshake its passes. Arbiter circuits for passing asynchronous handshakes are known per se.

In another embodiment memories (e.g. latches and/or flip-flops) may be provided, each between a respective one of the locally synchronous circuit modules 80*a–c* and the multiplexer and/or demultiplexer 86. Information that is exchanged between the locally synchronous circuit modules 80*a–c* and the second circuit 82 is stored during the handshake, for example in response to a request signal from the relevant locally synchronous circuit module 80*a–c*. This has the advantage that the arbiter can acknowledge the handshake from the locally synchronous circuit module 80*a–c* before the second circuit 82 has responded. In this case the arbiter 82 initiates a separate handshake with the second circuit 82, to exchange the information from the memory when the separate handshake is answered by the second circuit 82.

A more complicated design is preferably used in case of overlaid information exchange, such as if second circuit 82 is a memory that inputs an address in the same cycle in which it outputs read data for a previous address. In this case an exchange module is preferably added to the circuit of FIG. 8.

Figure 9:
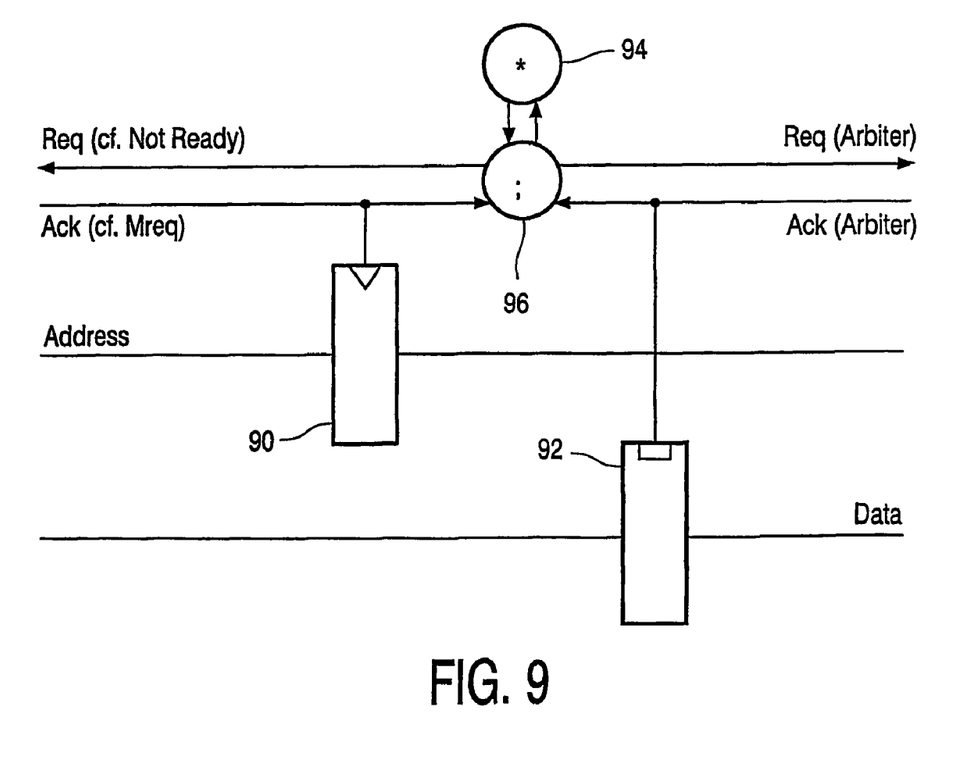
FIG. 9 shows an exchange module.

FIG. 9 shows an exchange module for use in such a circuit. The exchange module contains a first register 90, a second register 92, a repeater 94 and a sequencer 96. The repeater 94 and the sequencer 96 are conventional asynchronous circuit components. Basically, the repeater 94 repeatedly starts a handshake and when that handshake has been finished, it starts another handshake and so on indefinitely. Sequencer 96 starts a handshake at its left-hand port when sequencer 96 receives a request signal from the repeater 94 and sequencer 96 starts a handshake at its right-hand port when the handshake at the left-hand port is acknowledged. When the handshake at the right-hand port has been acknowledged sequencer 96 acknowledges the handshake from the repeater 92.

The first register 90 stores addresses for the memory in response to acknowledge signals from the left-hand port. The second register stores read data from the memory in response to acknowledge signals from the right-hand port.

In an embodiment an exchange module of this type is included between each of the locally synchronous modules 90*a–c* on one hand and the arbiter 88 and the multiplexer and/or demultiplexer 86 on the other hand.

The exchange module makes the combination of the memory, multiplexer and/or demultiplexer 86 and arbiter 88 appear to each locally synchronous circuit module 90*a–c* as if it was a memory that was not shared with other locally synchronous circuit modules 90*a–c*. The exchange module acknowledges requests from the locally synchronous circuit module 80*a–c*, it stores the corresponding address in the first register 90 and starts a handshake towards the memory 92. At a next handshake the locally synchronous circuit module 80*a–c* is acknowledged only when the memory has acknowledged the handshake that was started in response to the preceding handshake. At that time the data read in response to the preceding address is available in the second register.

Thus, by using the embodiments of the locally synchronous modules 90a–c and their handshake interface are of FIG. 4 and/or 6, the locally synchronous module 90a–c can operate at maximum speed when it does not need to access memory and its clock signal is delayed by a minimum amount when it accesses memory. If the memory is much faster than one or more of the locally synchronous circuit modules 80a–c, the locally synchronous circuit module 80a–c are hardly delayed by the fact that they share the same memory, because the handshake between the exchange module and the locally synchronous circuit module can be completed before the arbiter has granted access. Write operations need not wait for the return of data with a next handshake.

Of course, the locally synchronous modules 90a–c and their handshake interfaces may have multiple ports, as shown in FIGS. 4 and 6. In this case multiple memories each possibly shared to a greater or lesser extent may be connected in parallel via different ports. Thus no delay occurs in the clock signals when the locally synchronous modules 90a–c and their handshake interfaces access different memories. Similarly some of the ports may mutually connect the locally synchronous modules 90a–c and their handshake interfaces. Thus no memory is needed for communication between the locally synchronous circuit modules 90a–c and no delay is occurred due to the memory.

The invention claimed is:

1. A digital electronic circuit comprising:
a locally synchronous circuit module with a clock input and storage elements, the clock input being used to time storage of information transferred between the storage elements in the locally synchronous circuit module;
a delay circuit having an input and output coupled to the clock input, the delay circuit providing a delay which when incorporated in a clock oscillator ensures a clock period that is at least as long as needed to transfer information between the storage elements;
a further circuit;
a handshake circuit for generating handshake signals for timing information transfer between the storage elements and the further circuit, the handshake circuit comprising the delay circuit, so that at least part of the handshake signals during a handshake transaction are timed by travelling through the delay circuit and are applied to the clock input to clock the locally synchronous circuit module.

2. A digital electronic circuit according to claim 1, the circuit comprising a rerouting circuit for rerouting a coupling between the output and the input of the delay circuit under control of the locally synchronous circuit module, the rerouting circuit rerouting the coupling between a local path that causes the delay line to generate a local clock oscillation autonomously, and a handshake path that causes the delay line to pass the at least part of the handshake signals through the handshake circuit synchronized by the further circuit.

3. A digital electronic circuit according to claim 2, wherein the further circuit is arranged to operate using temporally overlaid information exchange transactions, the local path comprising an disabling input for disabling feedback of signal transitions from the output to the input of the delay circuit, the disabling input being coupled to an output of the further circuit that disables feedback until the further circuit has completed a final part of a last previous information exchange transaction.

4. A digital electronic circuit according to claim 3, comprising an enabling circuit for overruling disabling of the coupling via the local path by the further circuit before the final part of the last previous information exchange transaction has been completed, said overruling being selected under control of a command signal from the locally synchronous circuit module.

5. A digital electronic circuit according to claim 3, wherein the further circuit comprises a memory with an address and data interface coupled to the locally synchronous circuit module, the memory being arranged to generate a ready signal signalling that data is available at the same time as signalling that the memory is ready to receive a next address, the handshake path, when active, feeding the ready signal to a request input of the memory, the disabling input being arranged to disable the local path until the ready signal indicates that data is available.

6. A digital electronic circuit according to claim 2, wherein the further circuit comprises a plurality of units each with a respective handshake interface, the rerouting circuit rerouting the coupling via a selected one of the handshake interfaces, said selected one of the handshake interfaces being selected under control of the locally synchronous circuit module.

7. A digital electronic circuit according to claim 2, wherein the further circuit comprises a memory with an address and data interface coupled to the locally synchronous circuit module, the information transfer between the storage element and the further circuit comprising transfer of an address and data, the rerouting circuit routing the coupling through the handshake path when the locally synchronous circuit module accesses the memory and subsequently through the local path.

8. A digital electronic circuit according to claim 1, wherein the locally synchronous circuit module is one of a plurality of locally synchronous circuit modules, each locally synchronous circuit module having its own handshake circuit and its own delay circuit coupled to its clock input, the digital electronic circuit comprising an arbiter and a multiplexer and/or demultiplexer coupled between the locally synchronous circuit modules and the handshake circuits, the arbiter arbiting an order in which the handshake transactions from different ones of the locally synchronous circuit modules may progress accompanied by information exchange from the locally synchronous circuit module via the multiplexer and/or demultiplexer.

9. A digital electronic circuit according to claim 8, wherein the further circuit is a memory that transfers read data in overlaid fashion with addresses, the digital electronic circuit comprising a respective exchange module for each locally synchronous circuit module, the exchange module being designed to make the memory appear as if it was not shared with any other locally synchronous circuit module.

10. A system component comprising:
a locally synchronous circuit module with a clock input and storage elements, the clock input timing storage of information transferred between the storage elements in the locally synchronous circuit module;
a delay circuit having an input and output coupled to the clock input, the delay circuit providing a delay that is at least as large as a time interval needed for transferring information between the storage elements;
a connection for connecting a further circuit;
a handshake circuit for generating handshake signals for timing information transfer between the storage elements and the connection for the further circuit, the handshake circuit comprising the delay circuit, so that at least part of the handshake signals during a handshake transaction are timed by travelling through the delay circuit and are applied to the clock input to clock the locally synchronous circuit module.

* * * * *